June 25, 1957   J. M. BROOKE   2,797,284
LIQUID LEVEL MEASUREMENT AND CONTROL
Filed July 27, 1953   2 Sheets-Sheet 1

INVENTOR.
J. M. BROOKE
BY Hudson & Young
ATTORNEYS

June 25, 1957  J. M. BROOKE  2,797,284
LIQUID LEVEL MEASUREMENT AND CONTROL
Filed July 27, 1953  2 Sheets-Sheet 2
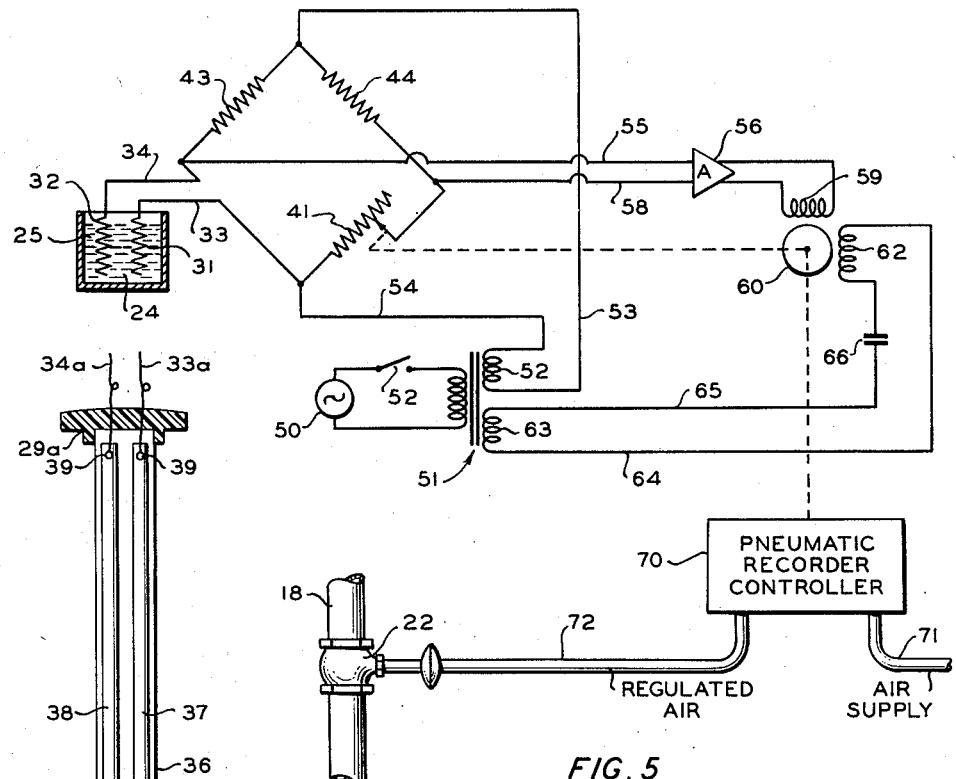
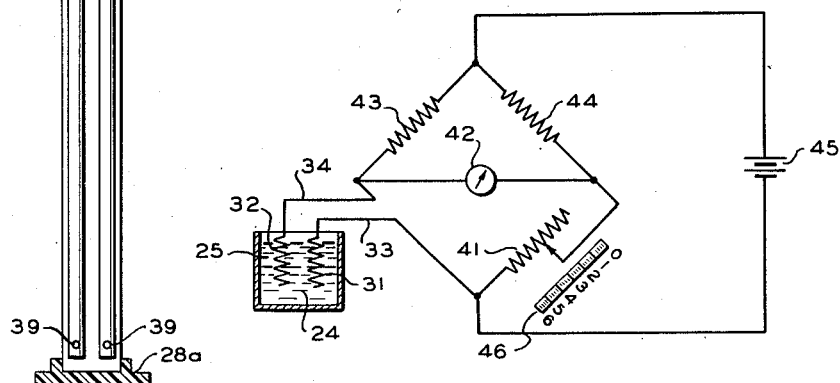
FIG. 5
FIG. 3
FIG. 4
INVENTOR.
J. M. BROOKE
BY Hudson & Young
ATTORNEYS United States Patent Office 2,797,284
Patented June 25, 1957

2,797,284

LIQUID LEVEL MEASUREMENT AND CONTROL

Jesse Maxey Brooke, Sweeny, Tex., assignor to Phillips Petroleum Company, a corporation of Delaware Application July 27, 1953, Serial No. 370,594

1 Claim. (Cl. 201—48)

This invention relates to apparatus for measuring liquid levels. In one aspect it relates to apparatus for measuring the level of corrosive liquids such as hydrofluoric acid. In another aspect it relates to apparatus for measuring the interface in hydrocarbon-acid settling tanks and for maintaining the interface at a desired level.

The measurement of liquid levels of corrosive materials such as hydrofluoric acid has been a problem of long standing. Probably the simplest form of liquid level gage comprises a glass tube positioned adjacent the tank of fluid under measurement and communicating with the tank such that the liquid in the tube is at the same level as the liquid in the tank. Unfortunately, a gage of this type cannot be used in measuring hydrofluoric acid because such acid would attack the glass tube. The various types of float gages known in the art for measuring liquid levels are decidedly limited in applications involving measuring corrosive materials because of the sealing problem encountered in preventing the materials from contacting the moving parts of the float gage. Furthermore, these float gages are somewhat complicated and present a maintenance problem.

In accordance with the present invention there is provided an improved liquid level indicator for use in measuring the level of fluids which are electrically conductive. This indicator comprises generally a pair of elongated electrical resistance elements which are positioned in a generally vertical position in spaced relation in the tank containing the liquid under measurement. These two resistance elements are in electrical contact with the liquid under measurement such that the two elements are electrically connected at the surface of the liquid. In this manner the effective series resistance of the portions of the two elements above the liquid surface is indicative of the liquid level since the lower portions of the two elements are electrically connected at the surface of the liquid. This effective series resistance of the two elements is measured in a convenient manner such as by inserting the elements in one arm of a Wheatstone bridge. The Wheatstone bridge can be calibrated to measure the liquid level directly or an unbalance signal from the bridge can be employed to actuate suitable control mechanism to maintain the liquid level at a desired value. The liquid level gage of this invention is particularly useful for measuring the level of corrosive materials because the resistance elements can readily be constructed of materials which resist the corrosive action of the liquid under measurement.

Accordingly, it is an object of this invention to provide an improved liquid level gage which is adapted for use in measuring the level of corrosive materials.

A further object is to provide a liquid level measurement and control system to maintain a liquid level at a predetermined value.

A further object of this invention is to provide a liquid level gage for use in corrosive materials which is of simplified construction, which incorporates no moving parts in the liquid and which provides an accurate indication of the liquid level.

Various other objects and features of this invention should become apparent from the following detailed description taken in conjunction with the accompanying drawing in which:

Figure 3 is a view, shown partially in section, of a second embodiment of the liquid level measuring probe;

Figure 4 is a schematic circuit diagram of a first embodiment of the liquid level indicator; and Figure 5 is a schematic circuit diagram of a second embodiment of liquid level indicator and control apparatus associated therewith.

Figure 1:
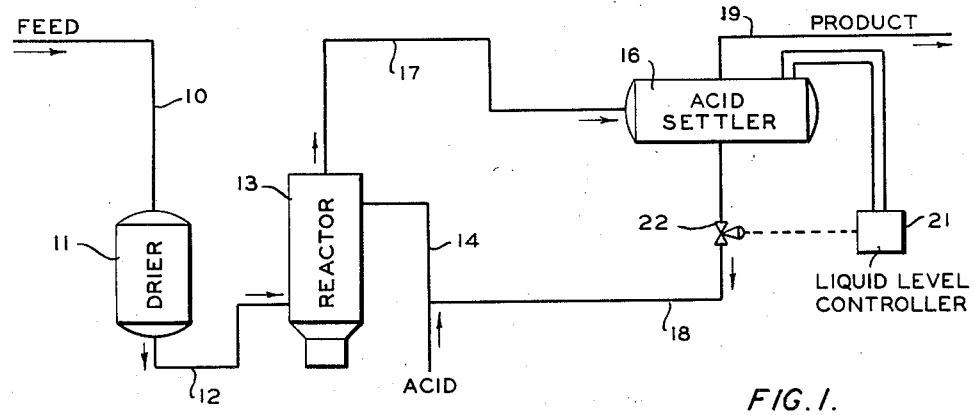
Figure 1 is a simplified illustration of a hydrofluoric acid alkylation unit incorporating the liquid level controller of the present invention to maintain a predetermined acid level in a hydrocarbon-acid settling tank.

Referring now to the drawing in detail and to Figure 1 in particular there is shown a simplified flow diagram of a hydrofluoric acid alkylation unit. The feed stream to the process, which comprises a mixture of isoparaffins and olefins, is passed through a line 10 to a drier unit 11 wherein it is dehydrated by a suitable drying agent such as bauxite or alumina. This feed stream then passes through a line 12 into a reactor 13. Hydrofluoric acid, which serves as a catalyst, is passed into reactor 13 through a line 14. From the reactor 13, the alkylate-acid stream is passed to an acid settling tank 16 through a line 17. In tank 16 the hydrofluoric acid settles to the bottom and the hydrocarbon floats thereon. This acid is recycled back to reactor 13 through a line 18 and the hydrocarbon product is removed through an overhead line 19 for further treating. It is important that the acid level in tank 16 be maintained at a low enough level in the tank that none of the acid is removed through product line 19. In order to provide this control a liquid level gage is incorporated in tank 16 to measure the acid level. In response to this measurement a controller unit 21 is employed to regulate a valve 22 in line 18 to maintain the hydrocarbon-acid interface at a preselected level.

Figure 2:
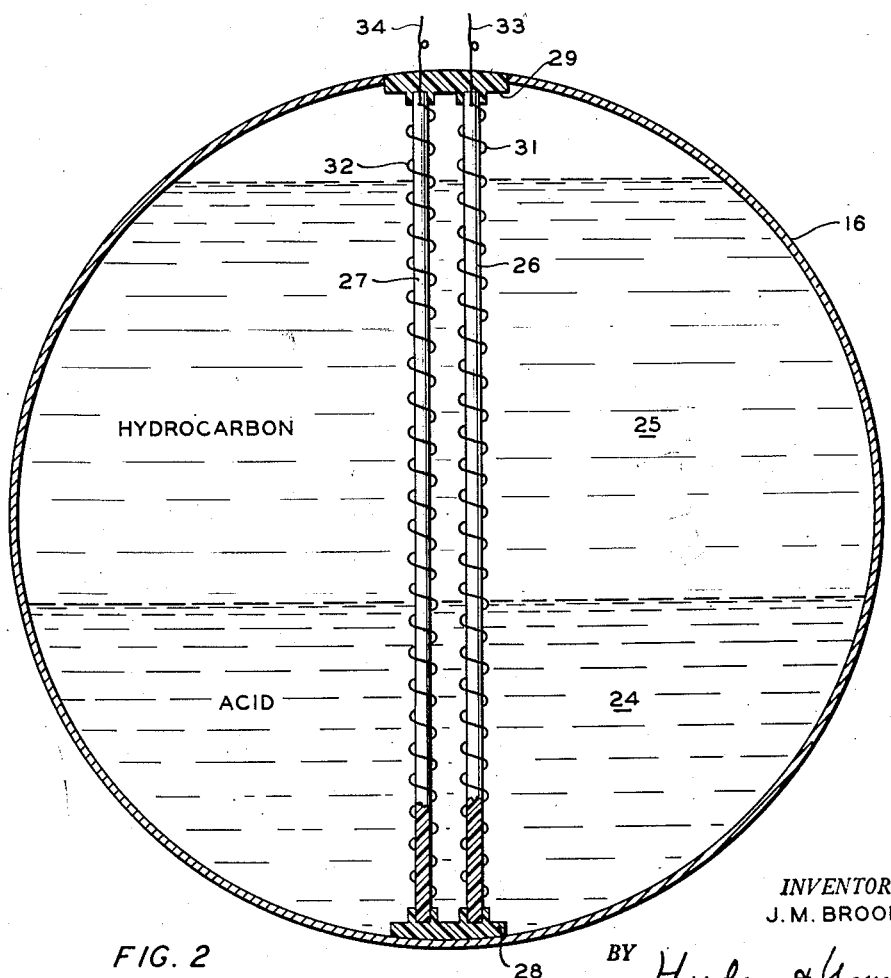
Figure 2 is a sectional view of the hydrocarbon-acid settling tank showing a liquid level probe element of the present invention positioned therein.

One embodiment of the liquid level measuring probe of the present invention is illustrated in Figure 2. The lower region of tank 16 contains the hydrofluoric acid 24 and the upper portion of tank 16 contains the hydrocarbon alkylate product 25. The probe measuring unit includes a pair of rods 26 and 27 which are constructed of electrically insulating material and which are positioned in a generally vertical direction in tank 16 in spaced relation with one another. The lower ends of rods 26 and 27 are fitted in a first support bracket 28 which is formed of non-corrosive material and which rests on the bottom of tank 16. The upper ends of rods 26 and 27 are fitted into a second support bracket 29 which is fitted into a suitable opening in the top of tank 16. Support bracket 29 is constructed of an electrically insulating material. A first coil 31 of electrically conductive material is mounted on rod 26 so as to extend substantially the entire length thereof and a second coil 32 is mounted in like manner on rod 27. Electrical leads 33 and 34 are connected to the respective upper ends of coils 31 and 32. Tank 16 can be constructed of carbon steel. Because of the corrosive nature of hydrofluoric acid it is necessary that bracket 28 and rods 26 and 27 be constructed of materials that are capable of withstanding prolonged contact with hydrofluoric acid. A suitable material which satisfies these requirements is polymerized tetrafluoroethylene which is known in the art as Teflon. Coils 31 and 32 preferably are formed of platinum wire which resists the corrosive action of hydrofluoric acid, although other materials such as rhodium and palladium can be employed, if desired. It is important that coils 31 and 32 be constructed of non-corrosive material because any corrosion would change the electrical properties thereof.

In Figure 3 there is illustrated a second embodiment of indicating probe which can be positioned in tank 16 in place of the probe illustrated in Figure 2. This assembly comprises an elongated plate of Teflon 36 which is secured at its lower and upper ends by respective brackets 28a and 29a. A pair of carbon strips 37 and 38 are mounted on plate 36 by a plurality of rivets 39 which are formed of a non-corrosive material such as platinum. Electrical leads 33a and 34a are connected to the upper ends of respective strips 37 and 38.

In Figure 4 there is shown a schematic circuit diagram of a first embodiment of the indicating instrument. This instrument comprises a Wheatstone bridge circuit having the level measuring probe connected in one arm thereof by leads 33 and 34. Coils 31 and 32 are shown as being partially immersed in the conductive acid 24. The non-conductive hydrocarbon 25 floats on acid 24. A calibrated variable resistor 41 is connected in the bridge circuit such that one end terminal thereof is connected to lead 33. The second end terminal of resistor 41 is connected to lead 34 through a galvanometer 42. A balancing resistor 43 has one end terminal thereof connected to lead 34 and a balancing resistor 44 has one end terminal thereof connected to the second end terminal of resistor 41. The second end terminals of resistors 43 and 44 are connected to one another and this common junction is connected to one terminal of a battery 45. The second terminal of battery 45 is connected to the junction between lead 33 and first end terminal of resistor 41. It should be apparent that the resistance between leads 33 and 34 is determined by the liquid level of acid 24 since coils 31 and 32 are in electrical contact at the surface of the conductive acid. If the level of the acid should rise the effective series resistance of coils 31 and 32 is lowered and if the level of the acid should fall the effective resistance of these coils is increased. The bridge circuit is electrically balanced by adjustment of variable resistor 41 until there is a null indication on galvanometer 42. The scale 46 associated with resistor 41 is calibrated such that the position of the arm of variable resistor 41 at balance provides a direct measurement of the level of acid 24.

In Figure 5 there is shown a second form of the indicating circuit which is adapted to operate a control instrument in accordance with the measured liquid level. The measuring probe assembly comprising coils 31 and 32 is connected into a Wheatstone bridge circuit which is generally similar to that shown in Figure 4 and wherein corresponding elements are designated by like reference numerals. The bridge circuit of Figure 5, however, is energized by alternating current which is provided by a voltage source 50, the latter being applied across the primary winding of a transformer 51 through a switch 52. The junction between resistors 43 and 44 is connected to one end terminal of a first secondary winding 52 of transformer 51 by a lead 53. The second end terminal of transformer winding 52 is connected by a lead 54 to the junction between lead 33 and resistor 41. The junction between lead 34 and resistor 43 is connected by a lead 55 to the first input terminal of an amplifier 56 and the junction between resistors 41 and 44 is connected by a lead 58 to the second input terminal of amplifier 56. The output terminals of amplifier 56 are connected across the first coil 59 of a servomotor 60. The second coil 62 of servomotor 60 is connected across the end terminals of a second secondary winding 63 of transformer 51 by leads 64 and 65. Lead 65 has a capacitor 66 connected therein such that the voltage applied across motor coil 62 is 90° out of phase with the voltage applied across motor coil 59, it being assumed that the voltage applied across coil 59 is either in phase or 180° out of phase with the voltage across transformer winding 52. Motor 60 is mechanically coupled to the arm of variable resistor 41 and to a pneumatic recorder-controller 70. Controller 70 can be any type of commercial instrument known in the art wherein a mechanical displacement serves to regulate a valve to adjust an air pressure. Controller 70 is supplied by a source of air pressure in a conduit 71, and an air pressure which is regulated in accordance with the rotation of motor 60 is transmitted from the recorder by a line 72. This latter regulated air pressure is applied to diaphragm valve 22 positioned in line 18.

The operation of the control circuit of Figure 5 should readily become apparent. Any electrical unbalance of the bridge circuit is applied to the input terminals of amplifier 56. The output voltage from amplifier 56 is applied to the first control winding 59 of motor 60. The voltage applied to winding 59 is balanced against the voltage applied across winding 62. The circuit is adjusted initially such that in the absence of a signal being applied to the input terminals of amplifier 56 motor 60 remains at rest. Any signal applied to amplifier 56, however, rotates motor 60 in a direction which is dependent upon the direction of unbalance of the bridge circuit. This rotation of motor 60 in turn moves the arm of resistor 41 until the bridge circuit is once again balanced. The magnitude of movement of the arm of resistor 41 necessary to restore balance is a function of the deviation of the liquid level from a preselected level. This rotation of motor 60 also is applied to recorder 70 to regulate the air in line 72. The regulated air pressure, in turn, adjusts diaphragm valve 22 to regulate the quantity of acid removed from tank 16. If the acid level in tank 16 should tend to rise above a predetermined amount the control circuit of Figure 5 functions to open valve 22 to remove a greater quantity of acid. If on the other hand the acid level should tend to fall in tank 16 below the predetermined level the circuit of Figure 5 functions to further close valve 22 such that a smaller quantity of acid is removed. The control circuit of Figure 5 obviously represents only one form of instrumentation which can be utilized to regulate the flow rate of acid in accordance with the level thereof in tank 16. It should readily be apparent that other forms of control mechanism well known in the art can be substituted in place of that illustrated. For example, the output signal from the bridge circuit can be utilized to operate a solenoid or a motor-driven valve if desired.

The probe element of Figure 3 obviously can be substituted for the probe of Figure 2 in either of the circuits of Figures 4 and 5, the carbon strips 37 and 38 being the resistance elements.

In view of the foregoing description it should be apparent that there is provided in accordance with this invention an improved form of liquid level gage which is particularly adapted for use in corrosive liquids. While this invention has been described in conjunction with present preferred embodiments thereof it is to be understood that the invention is not limited thereto.

What is claimed is:

Apparatus for measuring the level of hydrofluoric acid in a container comprising, in combination, an elongated support of polymerized tetrafluoroethylene adapted to be positioned in a generally vertical direction in the container, a bracket of non-corrosive material attached at each end of said support to position same in the container, first and second elongated bars of carbon, a plurality of platinum rivets attaching said bars to said support in spaced relationship with one another so that said bars extend longitudinally of said support, and electrodes connected to first ends of said bars to enable the bars to be connected to a resistance measuring circuit.

(References on following page)

References Cited in the file of this patent

UNITED STATES PATENTS

| | | |
|---|---|---|
| 1,172,650 | Walton | Feb. 22, 1916 |
| 1,602,444 | Naimen | Oct. 12, 1926 |
| 2,138,677 | Meyer | Nov. 29, 1938 |
| 2,394,220 | Wagner | Feb. 5, 1946 |
| 2,400,099 | Brubaker | May 14, 1946 |
| 2,593,351 | Shannon | Apr. 15, 1952 |
| 2,659,068 | Erickson et al. | Nov. 8, 1953 |

FOREIGN PATENTS

| | | |
|---|---|---|
| 126,930 | Switzerland | July 16, 1928 |

OTHER REFERENCES

B/W Controller Corp. catalogue No. 145, 1944, Birmingham, Mich., page 14, column 2.

Electronics, vol. 23, No. 4, April 1950, pp. 77–79.